United States Patent
Enna et al.

(10) Patent No.: US 6,406,642 B1
(45) Date of Patent: *Jun. 18, 2002

(54) POLYETHER-CONTAINING COMPOSITION SUITABLE FOR USE IN A REFRIGERATOR

(75) Inventors: Genichirou Enna; Hiroki Fukuda; Yoshihiro Ohtsuka, all of Kawasaki (JP)

(73) Assignee: Asahi Glass Company Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

(21) Appl. No.: 09/147,147
(22) PCT Filed: Feb. 17, 1998
(86) PCT No.: PCT/JP98/00641
§ 371 (c)(1), (2), (4) Date: Oct. 19, 1998
(87) PCT Pub. No.: WO98/37170
PCT Pub. Date: Aug. 27, 1998

(30) Foreign Application Priority Data

Feb. 20, 1997 (JP) ............................................. 9-036600

(51) Int. Cl.⁷ .................. C10M 105/18; C10M 107/34; C10M 171/00; C09K 5/02
(52) U.S. Cl. .......................................... 252/68; 252/67
(58) Field of Search ..................... 252/67, 68; 508/580, 508/579

(56) References Cited

U.S. PATENT DOCUMENTS 4,990,274 A * 2/1991 Nalesnik ..................... 508/580
5,269,955 A * 12/1993 Kawaguchi et al. .......... 252/68
5,403,503 A * 4/1995 Seike et al. .................... 252/68
5,639,719 A * 6/1997 Tanaka et al. ................. 252/68

FOREIGN PATENT DOCUMENTS

| EP | 0 397 037 | 11/1990 |
| JP | 9-071793 | 3/1997 |
| WO | WO 96/01301 | 1/1996 |

OTHER PUBLICATIONS

Chemical Abstracts, AN 125:145954, "Thermodynamic properties of closely boiling mixtures of R32 and R125", Doering et al., 1995.*
Chemical Abstracts, AN 125:145943, "Comparative energetic assessment of selected fluorohydrocarbons as alternative to R22", Ahnefeld et al., 1995.*
Chemical Abstracts, AN 124:121047, "R22 alternative refrigerant refrigerating unit", Watabe et al., 1995.*

* cited by examiner

*Primary Examiner*—Margaret Einsmann
(74) *Attorney, Agent, or Firm*—Oblon, Spivak, McClelland, Maier & Neustadt, P.C.

(57) ABSTRACT

A lubricating oil for freezers, which is made of a polyether represented by the general formula (1): $R^1-[X-OR^4]_s$, wherein $R^1$ represents an s-valent group having an aromatic nucleus, X represents a divalent group consisting of $-OR^2-$ and $-OR^3-$ groups (the numbers of which are q and r, respectively, on average), $R^2$ represents an ethylene group which may have a methyl group or ethyl group, $R^3$ represents an ethylene group having an alkoxymethyl group in which the alkoxyl group has 1 to 4 carbon atoms, and $R^4$ represents an alkyl group having 1 to 10 carbon atoms, s is an integer of 1 to 6, q is 0 to 6, r is at least 0.5, and (q+r)×s is 3 to 80, and which has a high compatibility with HFC refrigerant, a high stability to the hydrolisis and a high volume resistivity.

8 Claims, No Drawings

POLYETHER-CONTAINING COMPOSITION SUITABLE FOR USE IN A REFRIGERATOR

TECHNICAL FIELD TO WHICH THE INVENTION BELONGS

The present invention relates to a lubricating oil for refrigerator which is used for e.g. a compression type refrigerator such as an air conditioning system or an electric refrigerator. Particularly, it relates to a lubricating oil for refrigerator comprising a polyether which is excellent in compatibility with a hydrofluorocarbon type refrigerant (hereinafter referred to as a HFC type refrigerant) such as 1,1,1,2-tetrafluoroethane (hereinafter referred to as HFC-134a) difluoromethane (hereinafter referred to as HFC-32) or pentafluoroethane (hereinafter referred to as HFC-125).

PRIOR ART

Heretofore, dichlorodifluoromethane (hereinafter referred to as CFC-12) has been mainly used as a refrigerant for a refrigerator for car air conditioning or cold storage, and chlorodifluoromethane (hereinafter referred to as HCFC-22) has been mainly used as a refrigerant for a refrigerator for room air conditioning. However, with a view to protecting the ozone layer, a HFC type refrigerant such as HFC-134a, HFC-32 or HFC-125, has been developed as a refrigerant which can be substituted for a chlorine-containing refrigerant such as CFC-12 or HCFC-22.

As compared with CFC-12 or CFC-22, the HFC type refrigerant has a high polarity and shows no substantial compatibility with a lubricating oil such as an alkylbenzene or a naphthene type mineral oil which has been commonly used as a refrigerating machine oil. Thus, it tends to lead to double layer separation within the practical temperature range of the refrigerator. Once double layer separation takes place, oil return tends to be poor, which cases various serious problems such that the lubricating oil deposits on the inner wall of an heat exchanger, whereby the heat exchange rate tends to be poor, or lubrication failure or foaming at the start up occurs. Therefore, conventional refrigerating machine oils can not be used as refrigerating machine oils in such a new refrigerant atmosphere.

As refrigerating machine oils which can be used together with a HFC type refrigerant such as HFC-134a, polyether type oils (e.g. JP-B-4-78674, JP-A-1-259095, JP-A-2-102296 and JP-A-3-109492), polyether type oils (JP-A-3-502472, JP-A-3-505602, JP-A-3-88892, JP-3-217494, JP-A-5-25484 and JP-A-5-179268) and carbonate type oils (e.g. JP-A-3-217495, JP-A-4-18490, JP-A-4-63893, JP-A-5-32588, JP-A-5-32992, JP-A-5-186784 and JP-A-6-87791) have been proposed.

Problems to be Solved by the Invention

These refrigerating machine oils heretofore proposed have a high polarity as compared with an alkylbenzene or a naphthene type mineral oil and accordingly certainly have good compatibility with a HFC-type refrigerant such as HFC-134a. However, as compared with conventional working fluids of CFC-12/mineral oil type and CFC-22/mineral oil type, both the refrigerant and the refrigerating machine oil tend to have a high polarity and tend to contain water.

Accordingly, these refrigerating machine oils have drawbacks that the thermal stability in the co-existence of a HFC type refrigerant such as HFC-134a is poor, and they tend to hydrolyze e.g. a polyethyleneterephthalate film as a coating material of a coil for a motor for compressor. Especially the polyester type oils have a problem that they themselves undergo hydrolysis to form a carboxylic acid, and this carboxylic acid corrode a metal, thus reading to metal erosion. Whereas, the carbonate type oils have a problem that by the hydrolysis, non-condensable carbon dioxide will form.

Further, since a compressor motor is built in the compressor, good electrical insulation is required. However, with the polyether type lubricating oils which are excellent in that they do not undergo hydrolysis, the volume resistivity used to be about $10^{11}$ Ω/cm, and it can hardly be said that they have good electrical insulation properties.

Whereas, polyether type oils having low hygroscopic properties and good electrical insulation properties, have been proposed in JP-A-4-19295, JP-A-4-39394, JP-4-130188 and JP-A-6-330062. However, such polyether type oils did not fully satisfy all of the properties such as the compatibility with a HFC type refrigerant, low hygroscopic properties and high electrical insulation properties.

It is the object of the present invention to provide a refrigerating machine oil which exhibits good compatibility with a HFC type refrigerant within a wide temperature range and which is excellent in the electrical insulation properties, the lubricating properties, the low hygroscopic properties, durability, etc., and a composition for refrigerator comprising such an oil and a HFC type refrigerant.

Means to Solve the Problem

The present inventors have paid an attention to a polyoxyalkyleneglycol which has no problem of hydrolysis and have conducted a study earnestly to overcome above mentioned drawbacks of a polyoxyalkylene glycol oil, and they have found that a polyoxyalkylene glycol derivative having a certain structure is excellent in compatibility with a HFC type refrigerant and has a high volume resistivity of at least $10^{12}$ Ω/cm and have arrived at the present invention.

The present invention is a lubricating oil for refrigerator comprising a polyether represented by the following general formula (1):

$$R^1-[X-OR^4]_s \qquad (1)$$

wherein $R^1$ is a s-valent group having an aromatic nucleus, X is a bivalent group comprising average q —$OR^2$— and average r —$OR^3$—, $R^2$ is an ethylene group which may have a methyl group or an ethyl group, $R^3$ is an ethylene group having an alkoxymethyl group wherein the carbon number of the alkoxy group is from 1 to 4, $R^4$ is a $C_{1-10}$ alkyl group, s is an integer of from 1 to 6, q is from 0 to 6, and r is at least 0.5, provided that (q+r)×s is a number of from 3 to 80.

$R^1$ of the polyether represented by the general formula (1) in the present invention, is a s-valent group having an aromatic nucleus. s is an integer of from 1 to 6, and s is preferably an integer of from 1 to 2 from the availability of raw material. As a monovalent group having an aromatic nucleus, an aryl group or an aralkyl group, may, for example, be mentioned.

The aryl group is a residue having one hydrogen atom directly bonded to an aromatic nucleus removed from an aromatic hydrocarbon, and it may, for example, be a phenyl group, a biphenyl group or a naphthyl group, or such a group having an alkyl moiety. The aralkyl group is one having a hydrogen atom of an alkyl group substituted by an aryl group, and in other words, it is one having an aryl group bonded to one of the bonds of an alkylene group.

As a 2 to 6 valent group having an aromatic nucleus, a residue having from 1 to 5 hydrogen atoms removed from an aryl group or an aralkyl group, or a group having a hydroxyl group removed from a bisphenol such as bisphenol A, bisphenol F or bisphenol S, may, for example, be mentioned.

The above mentioned from 1 to 5 hydrogen atoms removed from an aryl group or an aralkyl group, may be either hydrogen atoms directly bonded to the aromatic nucleus or hydrogen atoms bonded to an alkyl moiety or an alkylene moiety directly bonded to the aromatic nucleus, or both of them.

Preferred $R^1$ is a monovalent group having an aromatic nucleus, particularly an aryl group, more preferably a phenyl group or a naphthyl group having an alkyl moiety.

The alkyl moiety of the phenyl group or the naphthyl group having an alkyl moiety may be straight chain, branched chain or cyclic. As the phenyl group or the naphthyl group having an alkyl moiety, the following groups are preferred:

A methylphenyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a dodecylphenyl group, a dimethylphenyl group, a diethylphenyl group, a dipropylphenyl group, a dibutylphenyl group, a dipentylphenyl group, a dihexylphenyl group, a diheptylphenyl group, a dioctylphenyl group, a dinonylphenyl group, a didecylphenyl group, a didodecylphenyl group, a methylnaphthyl group, an ethylnaphthyl group, a dimethylnaphthyl group, a diethylnaphthyl group, etc.

The alkylene moiety of the aralkyl group may be straight chain, branched chain or cyclic. As the aralkyl group, the following groups are preferred:

A benzyl group, a phenylethyl group, a phenylpropyl group, a phenylbutyl group, a phenylpentyl group, a phenylhexyl group, a phenylheptyl group, a phenyloctyl group, a phenylnonyl group, a phenyldecyl group, a phenyldodecyl group, a methylbenzyl group, a naphthylmethyl group, etc.

The carbon number of such an aryl group or an aralkyl group is preferably at most 14 from the viewpoint of the compatibility with a HFC type refrigerant. If it is larger than that, the compatibility with a HFC type refrigerant such as HFC-134a tends to decrease, and phase separation tends to result. The carbon number of a preferred alkyl group is from 6 to 12, and the carbon number of a preferred aralkyl group is from 7 to 12.

X in the general formula (1) is a bivalent group comprising average q —$OR^2$— and average r —$OR^3$—. The average q means a number obtained by dividing the total number of —$OR^2$— in one molecule of the polyether represented by the general formula (1) by the number of the s-valent groups. Likewise, the average r means a number obtained by dividing the total number of —$OR^3$— in one molecule of the polyether represented by the general formula (1) by the number of the s-valent groups. Further, q is from 0 to 6, and r is at least 0.5, provided that (q+r)×s is a number of from 3 to 80.

In X, —$OR^2$— and —$OR^3$— are bonded so that adjacent $R^1$ and $R^2$, $R^1$ and $R^3$, $R^2$ and $R^3$, $R^3$ and $R^4$, and $R^2$ and $R^4$, are all bonded by ether bonds, like e.g. $R^1$—[$OR^2$—$OR^3$—$OR^4$]$_s$ or $R^1$—[$OR^3$—$OR^2$—$OR^4$]$_s$. Likewise, in a case where two or more —$OR^2$— in X are adjacent to one another, such adjacent $R^2$ and $R^2$ are bonded by an ether bond. The same applies to a case where two or more —$OR^3$— in X are adjacent to one another.

$R^2$ in the general formula (1) is an ethylene group which may have a methyl group or an ethyl group, i.e. an ethylene group, an ethylene group having an methyl group, or an ethylene group having an ethyl group. As the repeating unit —$OR^2$—, an oxyethylene group [—$OCH_2CH_2$—], an oxypropylene group [$OCH_2CH(CH_3)$—], or an oxy-1,2-butylene group may be mentioned. In one molecule, —$OR^2$— may be one member selected from an oxyethylene group, an oxypropylene group and an oxy-1,2-butylene group, or may contain two or more members selected therefrom. Here, the oxy-1,2-butylene group means "—$OCH_2CH(C_2H_5)$—", "—$OCH(CH_3)CH(CH_3)$—" or "—$OCH_2C(CH_3)_2$—".

As such a repeating unit —$OR^2$—, one essentially containing an oxypropylene group is preferred from the viewpoint of the viscosity property and the volume resistivity. In the case of a polyether, in order to improve the volume resistivity, it is effective that the content of an oxy-1,2-butylene group is high rather than an oxyethylene group or an oxypropylene group. However, the compatibility with a HFC type refrigerant inversely decreases. Accordingly, the content of an oxy-1,2-butylene group in the total weight of —$OR^2$— in one molecule, is preferably at most 70wt %.

The oxyethylene group and the oxypropylene group are formed by ring-opening ethylene oxide and propylene oxide, respectively. The oxy-1,2-butylene group is formed by ring-opening 1,2-buthylene oxide, 2,3-butylene oxide or isobutylene oxide. Oxy-1,2-butylene groups in one molecule may be those obtained solely from the above mentioned same butylene oxide or may be oxyalkylene groups obtainable from the above mentioned two or more butylene oxides.

$R^3$ in the general formula (1) is an ethylene group having an alkoxymethyl group wherein the carbon number of the alkoxy group is from 1 to 4. As the repeating unit —$OR^3$—, an oxy(methoxymethyl)ethylene group, an oxy(ethoxymethyl)ethylene group, an oxy(propoxymethyl)ethylene group and an oxy(buthoxymethyl)ethylene group may be mentioned, and it may be one member selected from these or may be two or more members selected from these. In the case of two or more members, their linkage may be block or random. Here, —$OR^3$— may be represented by the general formula [—$OCH_2CH(CH_2OC_nH_{2n+1})$—, wherein n is an integer of from 1 to 4].

As the repeating unit —$OR^3$—, one containing an oxy(methoxymethyl)ethylene group or an oxy(ethoxymethyl)ethylene group, is preferred from the viewpoint of the compatibility with a HFC type refrigerant and the viscosity characteristic. Further, in order to improve the volume resistivity, it is effective that the content of an oxy(butoxymethyl)ethylene group is high rather than the content of an oxy(methoxymethyl)ethylene group. However, the compatibility with a HFC type refrigerant inversely decreases. Accordingly, the content of an oxy(butoxymethyl)ethylene group in the total weight of —$OR^3$— in one molecule, is preferably at most 70 wt %.

As the oxy(alkoxymethyl)ethylene group, one formed by ring-opening an alkylglycidyl ether such as methylglycidyl ether, ethylglycidyl ether, propylglycidyl ether or butylglycidyl ether, may be mentioned. Oxy(alkoxymethyl) ethylene groups in one molecule may be those obtainable solely from the above mentioned same alkyl glycidyl ether, or may be oxy(alkoxymethyl) ethylene groups obtainable from the above-mentioned two or more alkylglycidyl ethers. In the case of two or more members, their linkage may be block or random.

In X in the general formula (1), linkage of —$OR^2$— and —$OR^3$— may be block or random.

$R^4$ in the general formula (1) is a $C_{1-10}$ alkyl group. The $C_{1-10}$ alkyl group may be straight chain, branched chain or cyclic. Specific examples of the alkyl group include a methyl group, an ethyl group, a n-propyl group, an isopropyl group, a butyl group, a pentyl group, a hexyl group, a heptyl group, an octyl group, a nonyl group, a decyl group, a cyclopentyl group and a cyclohexyl group. From the viewpoint of the compatibility with a HFC type refrigerant, $R^4$ is preferably a $C_{1-4}$ alkyl group.

In the general formula (1), s is an integer of from 1 to 6, and when s is 2 or more, the plurality of X in one molecule may be the same or different. q is from 0 to 6, and r is at least 0.5, provided that (q+r)×s is a number of from 3 to 80. q being 0 means that there is no —$OR^2$— in one molecule of the polyether represented by the general formula (1).

If the value of (q+r)×s exceeds 80, the object of the present invention can not adequately be accomplished from the viewpoint of the kinematic viscosity. A preferred value of (q+r)×s is from 3 to 40, and a more preferred value of (q+r)×s is from 3 to 15. From the viewpoint of the solubility, preferred q is from 0 to 5, and more preferred q is from 1 to 4. From the viewpoint of the kinematic viscosity, preferred r is from 0.5 to 10, and more preferred r is from 1 to 7.

The polyether represented by the general formula (1) to be used in the present invention may be synthesized by various methods. For example, the following method may be mentioned when the polyether has —$OR^2$—.

A method wherein an alkylene oxide and an alkylglycidyl ether are added to a compound represented by the general formula $R^1(OH)_s$ (wherein $R^1$ is a s-valent group having an aromatic nucleus, and s is an integer of from 1 to 6) to obtain a polyether, which is then alcoholated with alkali and then reacted with an alkyl monohalide for etherification. As the alkyl monohalide, a $C_{1-10}$ alkyl chloride, bromide or iodide may, for example, be mentioned.

By simultaneously carrying out addition of the alkylene oxide and the alkylgrycidyl ether to the compound represented by the above general formula $R^1(OH)_s$, one wherein linkage of —$OR^2$— and —$OR^3$— is random, can be obtained, and by separately carrying out addition of the alkylene oxide and the alkylgrycidyl ether, one wherein the linkage of —$OR^2$— and —$OR^3$— is block, can be obtained.

The kinematic viscosity at 100° C. of the polyether in the present invention, is preferably from 1 to 100 cSt, more preferably from 2 to 30 cSt. Further, the kinematic viscosity at 40° C. is preferably from 1 to 10,000 cSt, more preferably from 5 to 1,000 cSt. Particularly preferred kinematic viscosity at 40° C. is from 5 to 500 cSt. Further, the double layer separation temperature at a low temperature with a HFC type refrigerant is preferably not higher than 0° C., more preferably not higher than −10° C.

To the lubricating oil for refrigerator of the present invention, a mineral oil, a polyα-olefin oil, an alkylbenzene oil, a polyolester oil, a polyether oil other than the polyether oil of the present invention, a perfluoropolyether oil, a fluorinated silicone oil, a phosphate oil, or a tartarate oil may be incorporated within a range not to impair the compatibility with a HFC type refrigerant. The blend ratio is preferably from 1 to 300 parts by weight, more preferably from 10 to 100 parts by weight, per 100 parts by weight of the lubricating oil for refrigerator of the present invention.

The present invention further provides a composition for refrigerator comprising a HFC type refrigerant and the above mentioned lubricating oil for refrigerator. The proportions of the lubricating oil and the refrigerant in the composition for refrigerator of the present invention, are not particularly limited.

To the lubricating oil of the present invention, various additives which have been commonly incorporated to oil agents, such as a withstand load additive, an acid binding agent, an antioxidant, a metal inactivating agent, an extreme pressure agent, a viscosity index improver, etc., may be added as the case requires. As the above acid binding agent, it is effective to add, for example, a compound having an epoxy group, an orthoester, acetal or carbodiimide. Further, it is effective to add an abrasion preventive agent such as a triaryl phosphate, a triaryl phosphite, a trialkyl phosphate, a trialkyl phosphite, zinc alkyldithiophosphate, zinc arylthiophosphate or molybdenum dithiocarbamate, or a viscosity index improver such as grycerol ether. Further, in order to improve the thermal stability, a phenol type compound or an aromatic amine type compound having an radical-binding ability may be added.

For the composition for refrigerator of the present invention, various HFC type refrigerants may be used alone or in admixture. The HFC type refrigerant to be used in the present invention, may be one member or a mixture of two or more members selected from HFC-34, HFC-125, HFC-134a, 1,1,1-trifluoroethane (hereinafter referred to as HFC-143a), 1,1-difluoroethane and 1,1,2,2-tetrafluoroethane.

As the mixture, particularly preferred is a mixture of HFC-32, HFC-125 and HFC-135a, a mixture of HFC-125, HFC-134a and HFC-143a, a mixture of HFC-125 and HFC-143a, or a mixture of HFC-32 and HFC-125.

EXAMPLES

Examples 1 to 8 are Preparation Examples for various polyethers. Examples 9 to 13 and Examples 19 to 23 are Working Examples. Examples 14 to 18 and Examples 24 to 28 are Comparative Examples. Evaluations of the performances of the refrigerating machine oils in Working Examples and Comparative Examples were in accordance with the following test methods. "parts" represents "parts by weight". "kinematic viscosity" was measured in accordance with JIS K2283. For the "compatibility", a sample oil and a mixture of three refrigerants [HFC-32/HFC-125/HFC-134a=23/25/52(weight ratio)] or a mixture of two refrigerants [HFC-32/HFC-125=50/50(weight ratio)] were sampled into a glass tube in a ratio so that the sample oil became 10 vol % of the entirety, and the total would be 2 cc, mixed and sealed. This glass tube was put into a constant temperature tank, and the compatibility of the test oil and the refrigerant within a range of from −30 to +30° C., was measured. "volume resistivity" was measured in accordance with JIS C2101 (test on electrical insulation oil).

Example 1

150 parts of p-tert-butylphenol and 2.5 parts of potassium hydroxide were put into a reactor and stirred and mixed at 80° C. for 30 minutes and then heated to 120° C., and water was removed under reduced pressure for 3 hours. After removal of water, while maintaining the temperature at 110° C., 178 parts of propylene oxide (hereinafter referred to as PO) was supplied over a period of two hours to the reactor. Along with the supply of PO, the inner pressure of the reactor increased to a level of the maximum of 3 atm, but along with the progress of the reaction, the inner pressure decreased. After completion of the supply of PO, aging was carried out for two hours, and after confirming that the inner pressure became constant, 308 parts of methyl glycidyl ether was continuously supplied over a period of two hours. As the internal pressure did not substantially change before and after the supply, after continuing the reaction for 3 hours after completion of the supply, deaeration was carried out under reduced pressure at 120° C. for two hours.

After returning the reactor to a normal pressure, while continuing the stirring, an inorganic acid in an equivalent amount equal to the amount of potassium in the reactor, was added for neutralization, and 2 parts of synthetic magnesium was added as adsorbent. The temperature was raised to 120° C., and after stirring for 30 minutes, water was removed for 3 hours under reduced pressure, followed by pressure filtration to obtain 710 parts of raw material polyoxyalkylene glycol having a hydroxyl value of 88.5 mgKOH/g and a kinematic viscosity of 108 cSt at 40° C.

646 parts of the raw material polyoxyalkylene glycol thereof and 84.1 parts of potassium hydroxide were put into a reactor and stirred and mixed at 80° C. for 30 minutes. Then, the temperature was raised to 120° C., and water was removed under reduced pressure for 3 hours. After the removal of water, nitrogen substitution was carried out three times to sufficiently remove oxygen in the reactor. Then, while maintaining the temperature at 70° C., 65.7 parts of methyl chloride was supplied to the reactor over a period of 5 hours.

Along with the supply of methyl chloride, the internal pressure of the reactor increased, but along with the progress of the reaction, the internal pressure decreased. After completion of the supply of methyl chloride, aging was carried out for 5 hours, and after confirming that the internal pressure was constant, deaeration was carried out under reduced pressure at 120° C. for one hour.

After returning the reactor to a normal pressure, while continuing the stirring, 400 parts of water was added to the reactor, followed by stirring at 80° C., and then the aqueous layer was removed. The remaining oil layer was neutralized by an addition of 26 parts of phosphoric acid, and 6.5 parts of synthetic magnesium was added as adsorbent. After stirring at 120° C. for 30 minutes, water was removed for three hours under reduced pressure, followed by pressure filtration to obtain a polyether having a kinematic viscosity of 62.7 cSt at 40° C.

The hydroxyl value of the obtained polyether was 1.44 mgKOH/g, and it was confirmed that 98.7% of the raw material polyoxyalkylene glycol was converted to the terminal methylated polyoxyalkyleneglycol.

Examples 2 to 4

Various polyethers were prepared in accordance with the operation in Example 1. Further, in Examples 3 and 4, instead of PO, a mixture comprising predetermined amounts of PO and 1,2-buthylene oxide, was supplied. The structures of the compounds thereby obtained, are shown in Table 1.

Example 5

A polyether was obtained by the same operation as in Example 1 except that phenol was used as an initiator, a mixture comprising PO/methylglycidyl ether/butylglycidyl ether in a weight ratio of 50/20/30, was supplied instead of PO, and ethyl chloride was supplied instead of methyl chloride. The structure of the obtained compound is shown in Table 1.

Examples 6 AND 7

A polyether of the general formula (1) wherein $R^1$ is an aliphatic hydrocarbon group, or $R^3$ is H, was prepared in accordance with the operation of Example 1. The structure of the obtained compound is shown in Table 1.

Example 8

A polyether of the general formula (1) wherein r is 0, was prepared in accordance with the operation of Example 1. The structure of the obtained compound is shown in Table 1.

Examples 9 to 18

With respect to the respective samples of the respective polyethers obtained in Examples.1 to 18 (which correspond to Examples 9 to 16, respectively), naphthene-type mineral oil Suniso 4GS (hereinafter referred to simply as S oil, which corresponds to Example 17) manufactured by Nippon San Sekiyu K. K. and a tetraester of isooctanoic acid with pentaerythritol (hereinafter referred to simply as E oil, which corresponds to Example 18), the kinematic viscosities and the volume resistivities were measured, and the results are shown in Table 2.

Further, the compatibility of these respective samples with a mixture of three refrigerants i.e. HFC-32/HFC-125/HFC-134a=23/25/52 (wt %) and a mixture of two refrigerants i.e. HFC-32/HFC-125=50/50 (wt %) within a temperature range of from −30 to +30° C., was examined. The results are also shown in Table 2.

Examples 19 to 28

To examine the thermal stability in the presence of water, the following sealed tube test was carried out with respect to the polyethers obtained in Examples 1 to 8 (which correspond to Examples 19 to 26, respectively), S oil (which corresponds to Example 27) and E oil (which corresponds to Example 28).

Namely, into a stainless steel autoclave having an internal capacity of 300 ml, 70 g of a refrigerating machine oil and 70 g of the same mixture of three refrigerants as used in Example 9, were charged, and one sheet each of iron, copper and aluminum metal pieces was added, and after sealing, heating was carried out at 175° C. for 14 days.

After completion of the test, each sample was deaerated under reduced pressure to remove the refrigerant mixture, the gas component and water, whereupon the appearance and the acid value of the sample were measured. The results were shown in Table 3. The appearance was measured in accordance with JIS K2580.

In Table 1, "$C_3$: $C_4$=1:2" in the column for the carbon number of $R^2$ represents that the molar ratio of the oxypropylene group to the oxy-1,2-butylene group is 1:2, and "$C_3$:$C_4$=1:1" represents that the molar ratio of the oxypropylene group to the oxy-1,2-buthylene group is 1:1. "methoxymethylethylene:butoxymethylethylene=1:1" in the column for the structure of $R^3$ represents that the molar ratio of the two is 1:1.

TABLE 1

| Ex. | Structure of $R^1$ | Carbon number of $R^2$ | Structure of $R^3$ | Average q | Average r | Structure of $R^4$ |
|---|---|---|---|---|---|---|
| 1 | $C_4H_9C_6H_4$— | $C_3$ | —$CH_2CH(CH_2OCH_3)$— | 3 | 3.5 | $CH_3$— |
| 2 | $C_8H_{17}C_6H_4$— | $C_3$ | —$CH_2CH(CH_2OCH_3)$— | 2 | 3.5 | $CH_3$— |
| 3 | $C_4H_9C_6H_4$— | $C_3$:$C_4$ = 1:2 | —$CH_2CH(CH_2OCH_3)$— | 3 | 4.0 | $CH_3$— |
| 4 | $C_8H_{17}C_6H_4$— | $C_3$:$C_4$ = 1:1 | —$CH_2CH(CH_2OCH_3)$— | 2 | 3.5 | $CH_3$— |

TABLE 1-continued

| Ex. | Structure of $R^1$ | Carbon number of $R^2$ | Structure of $R^3$ | Average q | Average r | Structure of $R^4$ |
|---|---|---|---|---|---|---|
| 5 | $C_6H_5$— | $C_3$ | * | 3 | 4.0 | $C_2H_5$— |
| 6 | $CH_3$— | $C_3:C_4 = 1:1$ | —$CH_2CH(CH_2OCH_3)$— | 4 | 4.0 | $C_2H_5$— |
| 7 | $C_4H_9C_6H_4$— | $C_3$ | —$CH_2CH(CH_2OCH_3)$— | 3 | 3.5 | H— |
| 8 | $C_4H_9C_6H_4$— | $C_3$ | — | 11 | 0 | $CH_3$— |

$C_4H_9C_6H_4$—: Butylphenyl group, $C_8H_{17}C_6H_4$—: Octylphenyl group,
$C_6H_5$—: Phenyl group, $CH_3$—: Methyl group,
$C_2H_5$—: Ethyl group,
—$CH_2CH(CH_2OCH_3)$—: Methoxymethylethylene group,
—$CH_2CH(CH_2OC_4H_9)$—: Butoxymethylethylene group,
*—$CH_2CH(CH_2OCH_3)$—: —$CH_2CH(CH_2OC_4H_9)$— = 1:1

TABLE 2

| Ex. | | Kinematic viscosity at 40° C. | Volume resistivity | Compatibility with a mixture of three refrigerants | Compatibility with a mixture of two refrigerants |
|---|---|---|---|---|---|
| 1 | 9 | 62.7 cSt | $5.4 \times 10^{12}$ Ω/cm | Completely dissolved | Completely dissolved |
| 2 | 10 | 64.2 cSt | $5.1 \times 10^{13}$ Ω/cm | Completely dissolved | Completely dissolved |
| 3 | 11 | 65.6 cSt | $1.8 \times 10^{13}$ Ω/cm | Completely dissolved | Completely dissolved |
| 4 | 12 | 67.2 cst | $7.1 \times 10^{13}$ Ω/cm | Completely dissolved | Completely dissolved |
| 5 | 13 | 58.8 cSt | $5.2 \times 10^{12}$ Ω/cm | Completely dissolved | Completely dissolved |
| 6 | 14 | 58.2 cSt | $2.2 \times 10^{11}$ Ω/cm | Completely dissolved | Completely dissolved |
| 7 | 15 | 70.3 cSt | $5.7 \times 10^{10}$ Ω/cm | Completely dissolved | Completely dissolved |
| 8 | 16 | 43.0 cSt | $2.4 \times 10^{12}$ Ω/cm | Completely dissolved | Not compatible at −5° C. or higher |
| | 17 | 56.0 cSt | $2.1 \times 10^{15}$ Ω/cm | Not compatible | Not compatible |
| | 18 | 32.0 cSt | $1.5 \times 10^{14}$ Ω/cm | Completely dissolved | Completely dissolved |

TABLE 3

| Sample Ex. | | Appearance Before test | Appearance After tests | Acid value (mgKOH/g) Before test | Acid value (mgKOH/g) After test | Metal piece Iron | Metal piece Copper | Metal piece Aluminum |
|---|---|---|---|---|---|---|---|---|
| 19 | Ex.1 | L 0.5 | L 0.5 | 0.01 | 0.01 | No change | No change | No change |
| 20 | Ex.2 | L 0.5 | L 0.5 | 0.01 | 0.01 | No change | No change | No change |
| 21 | Ex.3 | L 0.5 | L 0.5 | 0.01 | 0.01 | No change | No change | No change |
| 22 | Ex.4 | L 0.5 | L 0.5 | 0.01 | 0.01 | No change | No change | No change |
| 23 | Ex.5 | L 0.5 | L 0.5 | 0.01 | 0.01 | No change | No change | No change |
| 24 | Ex.6 | L 0.5 | L 0.5 | 0.01 | 0.01 | No change | No change | No change |
| 25 | Ex.7 | L 0.5 | L 0.5 | 0.01 | 0.01 | Changed to brown | Changed to black | No change |
| 26 | Ex.8 | L 0.5 | L 0.5 | 0.01 | 0.01 | No change | No change | No change |
| 27 | S oil | L 0.5 | L 0.5 | 0.01 | 0.01 | No change | No change | No change |
| 28 | E oil | L 0.5 | L 1.0 | 0.01 | 2.82 | Changed to brown | Changed to black | No change |

EFFECTS OF THE INVENTION

The polyether in the present invention is a compound which is excellent in the compatibility with a HFC type refrigerant and which has no hydrolysable bond such as an ester bond in the molecule, and accordingly, it is a compound having high stability against hydrolysis and a high volume resistivity and is excellent as a refrigerating machine oil for a substitute fluorocarbon refrigerant.

What is claimed is:
1. A lubricating composition, comprising:
  (a) a refrigerant comprising one or more hydrofluorocarbons; and
  (b) a polyether having the formula (1):

$$R^1\text{-}(X\text{—}OR^4)_s \qquad (1)$$

wherein:
  $R^1$ is a s-valent group having an aromatic nucleus;
  X is a bivalent group comprising average q —$OR^2$— and average r —$OR^3$—;
  $R^2$ is an ethylene group which is optionally substituted by methyl or ethyl;
  $R^3$ is an ethylene group substituted by an alkoxymethyl group wherein the carbon number of the alkoxy group is from 1 to 4;
  $R^4$ is $C_1$–$C_{10}$ alkyl;
  s is an integer of from 1 to 6;
  q is from 0 to 6; and
  r is at least 0.5;
  provided that (q+r)×s is a number of from 3 to 80.

2. The lubricating composition of claim 1, wherein $R^1$ in the formula (1) is a residue having from 1 to 5 hydrogen atoms removed from an aryl group, a residue having from 1 to 5 hydrogen atoms removed from an aralkyl group; an aryl group; or an aralkyl group.

3. The lubricating composition of claim 1, wherein —$OR^2$ in the general formula (1) is oxypropylene.

4. The lubricating composition of claim 1, wherein —$OR^3$ in the formula (1) is methoxymethylethylene.

5. The lubricating composition of claim 1, wherein $R^4$ in the formula (1) is $C_1$–$C_4$ alkyl.

6. The lubricating composition of claim 1, wherein the kinematic viscosity of the polyether at 40° C. is from 5 to 1000 cSt.

7. The lubricating composition of claim 1, wherein the refrigerant comprises one or more of difluoromethane, pentafluoroethane, 1,1,1,2-tetrafluoroethane, 1,1,1-trifluoroethane, 1,1-difluoroethane and 1,1,2,2-tetrafluoroethane.

8. The lubricating composition of claim 7, wherein the refrigerant comprises a mixture of difluoromethane, pentafluoroethane and, 1,1,1,2-tetrafluorocetane, a mixture of pentafluoroethane, 1,1,1,2-tetrafluoroethane and 1,1,1-trifluoroethane, a mixture of pentafluoroethane and 1,1,1-trifluoroethane, or a mixture of difluoromethane and pentafluoroethane.

* * * * *